United States Patent
Newhall, Jr.

(10) Patent No.: US 7,944,453 B1
(45) Date of Patent: May 17, 2011

(54) EXTRAPOLATION TEXTURE FILTERING FOR NONRESIDENT MIPMAPS

(75) Inventor: William P. Newhall, Jr., San Francisco, CA (US)

(73) Assignee: NVIDIA Corporation, Santa Clara, CA (US)

( * ) Notice: Subject to any disclaimer, the term of this patent is extended or adjusted under 35 U.S.C. 154(b) by 843 days.

(21) Appl. No.: 11/759,583

(22) Filed: Jun. 7, 2007

(51) Int. Cl.
- *G09G 5/00* (2006.01)
- *G06T 11/40* (2006.01)
- *G06T 15/00* (2006.01)
- *G06T 15/10* (2006.01)
- *G06T 15/20* (2006.01)
- *G06K 9/00* (2006.01)
- *G06K 9/32* (2006.01)

(52) U.S. Cl. ........ 345/587; 345/421; 345/428; 345/581; 345/606; 382/254; 382/260; 382/274; 382/300; 358/525

(58) Field of Classification Search .......... 345/418, 345/421–423, 426–428, 581, 582–587, 600–601, 345/606–612, 616, 618, 639, 643, 545, 552; 382/254, 276, 260–274, 300, 305; 358/523–525
See application file for complete search history.

(56) References Cited

U.S. PATENT DOCUMENTS

| | | | |
|---|---|---|---|
| 5,438,654 | A | 8/1995 | Drebin et al. |
| 5,943,242 | A | 8/1999 | Vorbach et al. |
| 6,021,490 | A | 2/2000 | Vorbach et al. |
| 6,081,903 | A | 6/2000 | Vorbach et al. |
| 6,119,181 | A | 9/2000 | Vorbach et al. |
| 6,338,106 | B1 | 1/2002 | Vorbach et al. |
| 6,405,299 | B1 | 6/2002 | Vorbach et al. |
| 6,425,068 | B1 | 7/2002 | Vorbach et al. |
| 6,480,937 | B1 | 11/2002 | Vorbach et al. |
| 6,542,998 | B1 | 4/2003 | Vorbach et al. |
| 6,571,381 | B1 | 5/2003 | Vorbach et al. |
| 6,697,979 | B1 | 2/2004 | Vorbach et al. |
| 6,744,438 | B1 | 6/2004 | Baldwin |
| 7,003,660 | B2 | 2/2006 | Vorbach et al. |
| 7,061,500 | B1 | 6/2006 | Baldwin |
| 7,210,129 | B2 | 4/2007 | May et al. |
| 7,266,725 | B2 | 9/2007 | Vorbach et al. |
| 7,372,467 | B1 * | 5/2008 | Toksvig et al. ............ 345/582 |
| 7,372,468 | B1 * | 5/2008 | Toksvig et al. ............ 345/582 |
| 7,394,284 | B2 | 7/2008 | Vorbach |
| 7,434,191 | B2 | 10/2008 | Vorbach et al. |

(Continued)

FOREIGN PATENT DOCUMENTS

JP 2004102998 4/2004

(Continued)

OTHER PUBLICATIONS

"Mipmap," Wikipedia, retrieved on Mar. 18, 2009 from http://web.archive.org/web/20060304052206/http://en.wikipedia.org/wiki/Mipmap.

(Continued)

*Primary Examiner* — Wesner Sajous
(74) *Attorney, Agent, or Firm* — Patterson & Sheridan, LLP

(57) ABSTRACT

A multi-threaded graphics processor is configured to use to extrapolate low resolution mipmaps stored in physical memory to produce extrapolated texture values while high resolution mipmaps are retrieved from a high latency storage resource. The extrapolated texture values provide an improved image that appears sharper compared with using the low resolution mipmap level texture data in place of the temporarily unavailable high resolution mipmap level texture data.

20 Claims, 10 Drawing Sheets

U.S. PATENT DOCUMENTS

| | | | |
|---|---|---|---|
| 7,444,531 B2 | 10/2008 | Vorbach et al. | |
| 7,528,551 B2 * | 5/2009 | Ball | 315/247 |
| 2003/0030646 A1 * | 2/2003 | Yeh | 345/582 |
| 2007/0165035 A1 * | 7/2007 | Duluk et al. | 345/506 |
| 2008/0303841 A1 * | 12/2008 | Newhall, Jr. | 345/587 |

FOREIGN PATENT DOCUMENTS

| | | |
|---|---|---|
| JP | 2005523465 | 8/2005 |
| JP | 2006127412 | 5/2006 |
| JP | 2006244426 | 9/2006 |
| WO | 03088203 | 10/2003 |

OTHER PUBLICATIONS

"Virtual Memory," Wikipedia, retrieved on Mar. 18, 2009 from http://web.archive.org/web/20061005090225/http://en.wikipedia.org/wiki/Virtual_memory.

Pharr, M, "GPU Gems 2: Programming Techniques for High-Performance Graphics and General Purpose Computation," Mar. 2005, Addison Wesley Professional, p. 556-563.

Kakimoto, M., "Fast Rendering Library for Large 3D Geographical Information," Joho Shori Gakkai Kenkyu Hokoku, vol. 2004, issue 121, p. 31-36.

JP Office Action in S/N JP 2008-149625, dated Nov. 24, 2010.

* cited by examiner

EXTRAPOLATION TEXTURE FILTERING FOR NONRESIDENT MIPMAPS

BACKGROUND OF THE INVENTION

1. Field of the Invention

The present invention generally relates to texture mapping and more specifically to using extrapolation to compute texture map values for mipmaps that are not available.

2. Description of the Related Art

As the use of virtual memo Type your question here and then click Search ry has become more commonplace, the number of texture maps that can be accessed during graphics processing is no longer limited by the amount physical memory (local or system) where the texture maps are conventionally stored. Texture data can be stored on other storage resources, such as disk drives, CD drives, or even remote servers that have higher access latency than the physical memory. The texture data is retrieved as it is needed during processing. However, unlike retrieving texture data from the physical memory, the image quality is compromised during the time that the texture data is retrieved from the other storage resources.

It is particularly advantageous to store high resolution mipmaps of a texture on the other storage resources since those mipmaps are larger. Lower resolution mipmaps of the texture can be stored in the physical memory and used to produce images while the high resolution mipmaps are retrieved from the other storage resources. The result is that the texture map data appears blurry and then sharpens when the high resolution mipmaps become available in the physical memory.

Accordingly, what is needed in the art are systems and methods for improving the appearance of low resolution texture map data that is used while high resolution mipmaps are retrieved from a high latency storage resource.

SUMMARY OF THE INVENTION

A multi-threaded graphics processor is configured to extrapolate low resolution mipmaps stored in physical memory to produce extrapolated texture values while high resolution mipmaps are retrieved from a high latency storage resource. The extrapolated texture values provide an improved image that appears sharper compared with using the low resolution mipmap level texture data in place of the high resolution mipmap level texture data. Filtered texture values are produced using a mipmap filter that extrapolates two resident levels of detail to approximate the increased contrast and detail that would be produced from filtering if the nonresident level of detail mipmap was resident.

A deltaLOD (level of detail) is computed as the difference between the LOD of the ideal mipmap and the extrapolation threshold LOD (a value greater than or equal to the LOD of the highest resolution resident mipmap). A resident mipmap is stored in (low access latency) physical memory in contrast with a nonresident mipmap that is stored in a high access latency storage resource. The deltaLOD is used to determine an extrapolation weight value that is used to produce the extrapolated texture values for use in place of the high resolution mipmap texture data.

Various embodiments of a method of the invention for extrapolating between resident mipmaps to produce texel values for a nonresident mipmap include computing an ideal level of detail (LOD) corresponding to an ideal mipmap, computing a deltaLOD as a difference extrapolation threshold LOD (a value greater than or equal to the LOD of the highest resolution resident mipmap) and the ideal LOD, determining an extrapolation weight based on the deltaLOD, and determining coarse and fine lodweights based on the extrapolation weight which produce an extrapolated texture value. The extrapolation-filtered result approximates the result that would be achieved with ideal mipmap and is computed using the weight, texel values from the resident mipmap whose level of detail is equal to the truncated extrapolation threshold LOD, and texel values from a lower resolution resident mipmap.

Various embodiments of the invention for extrapolating between resident mipmaps to produce texel values for a nonresident mipmap include a memory configured to store the resident mipmaps and a texture unit. The texture unit is coupled to the memory and configured to compute an ideal level of detail (LOD) corresponding to an ideal mipmap containing both those miplevels which are not resident in physical memory and those miplevels which are resident in physical memory, compute a deltaLOD as a difference between extrapolation threshold LOD (a value greater than or equal to the LOD of the highest resolution resident mipmap) and the ideal LOD, determine an extrapolation weight based on the deltaLOD, and compute an extrapolated texel value. The extrapolated texel value approximates a texel value of the ideal mipmap and is computed using the weight, texel values from the mipmap whose level of detail is equal to the truncated extrapolation threshold LOD, and texel values from a lower resolution resident mipmap.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
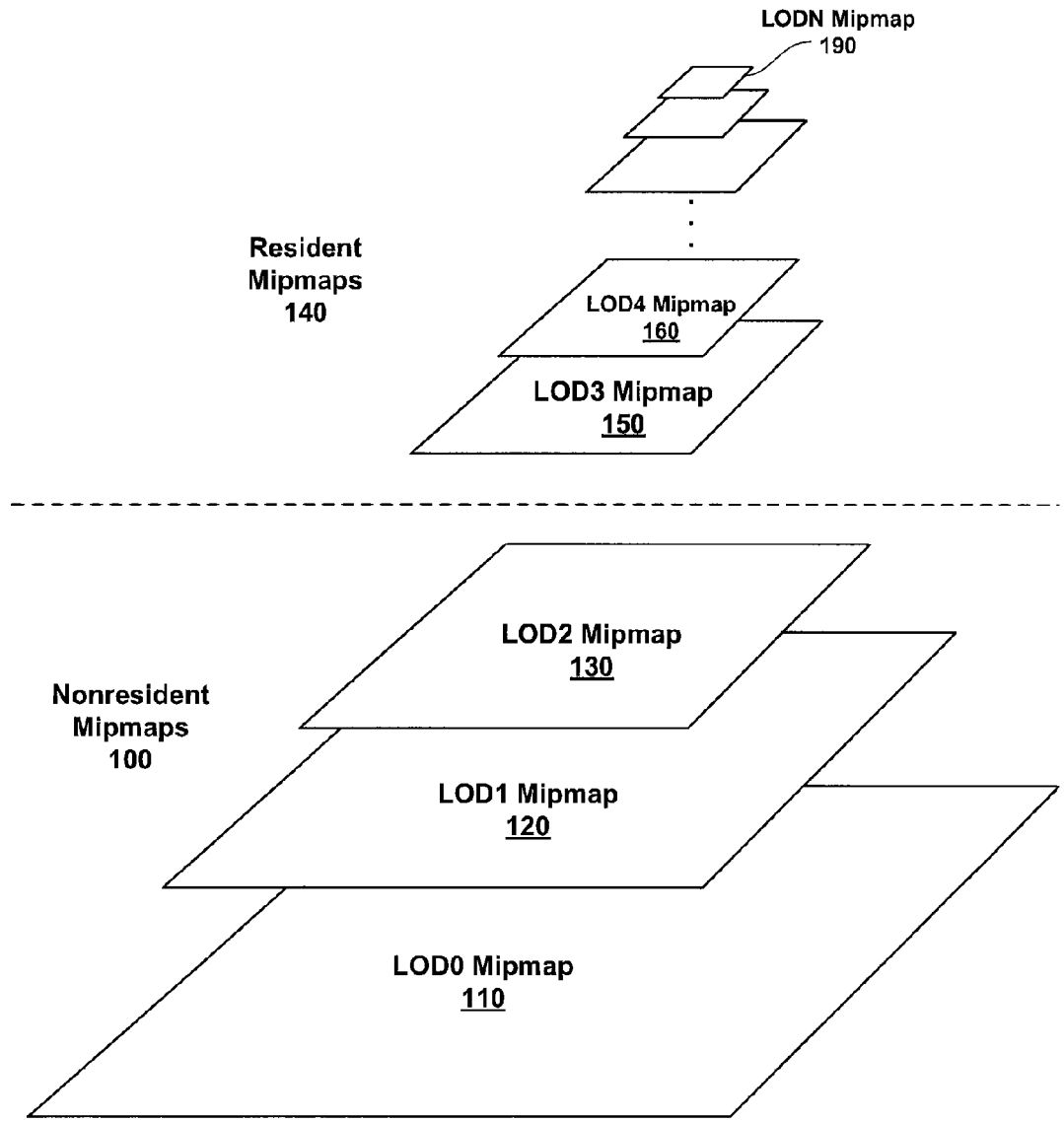
FIG. 1 illustrates a conceptual diagram of mipmaps of a texture for varying levels of detail (LOD) in accordance with one or more aspects of the present invention.

FIG. 1 illustrates a conceptual diagram of mipmaps of a texture image for varying LODs, in accordance with one or more aspects of the present invention. Each mipmap is a prefiltered version of the texture image for a particular resolution or level of detail (LOD), with LOD0 mipmap 110 having the highest resolution and LODN mipmap 190 having the lowest resolution, i.e., as the LOD index increases the resolution of the corresponding miplevel diminishes. When virtual memory mapping is used to represent a greater address space than is available in physical memory, not all of the addressable texture data is resident in physical memory. As shown in FIG. 1, LOD0 mipmap 110, LOD1 mipmap 120, and LOD2 mipmap 130 are not stored in physical memory, and are therefore nonresident mipmaps 100. Resident mipmaps 140, including LOD3 mipmap 150, LOD4 mipmap 160, and LODN mipmap 190, are stored in physical memory, so that the texture data stored in those mipmaps can be accessed with low latency.

When a software application requests texture filtering at a level of detail where all of the required mipmaps are resident in memory, the texture unit fetches texels from the required mipmaps and applies a filter which produces a value interpolated between the texels fetched from the resident mipmap levels, as is common in the state of the art. When a software application attempts to access a mipmap level that is paged out of physical memory, i.e., a nonresident mipmap, embodiments of the present invention fetch texels from the two nearest resident mipmaps and apply a filter which produces a value extrapolated from the texels fetched from the resident mipmap levels. Extrapolated texture values are computed and used to produce images until the nonresident mipmap is paged into physical memory, becoming a resident mipmap.

Figure 2A:
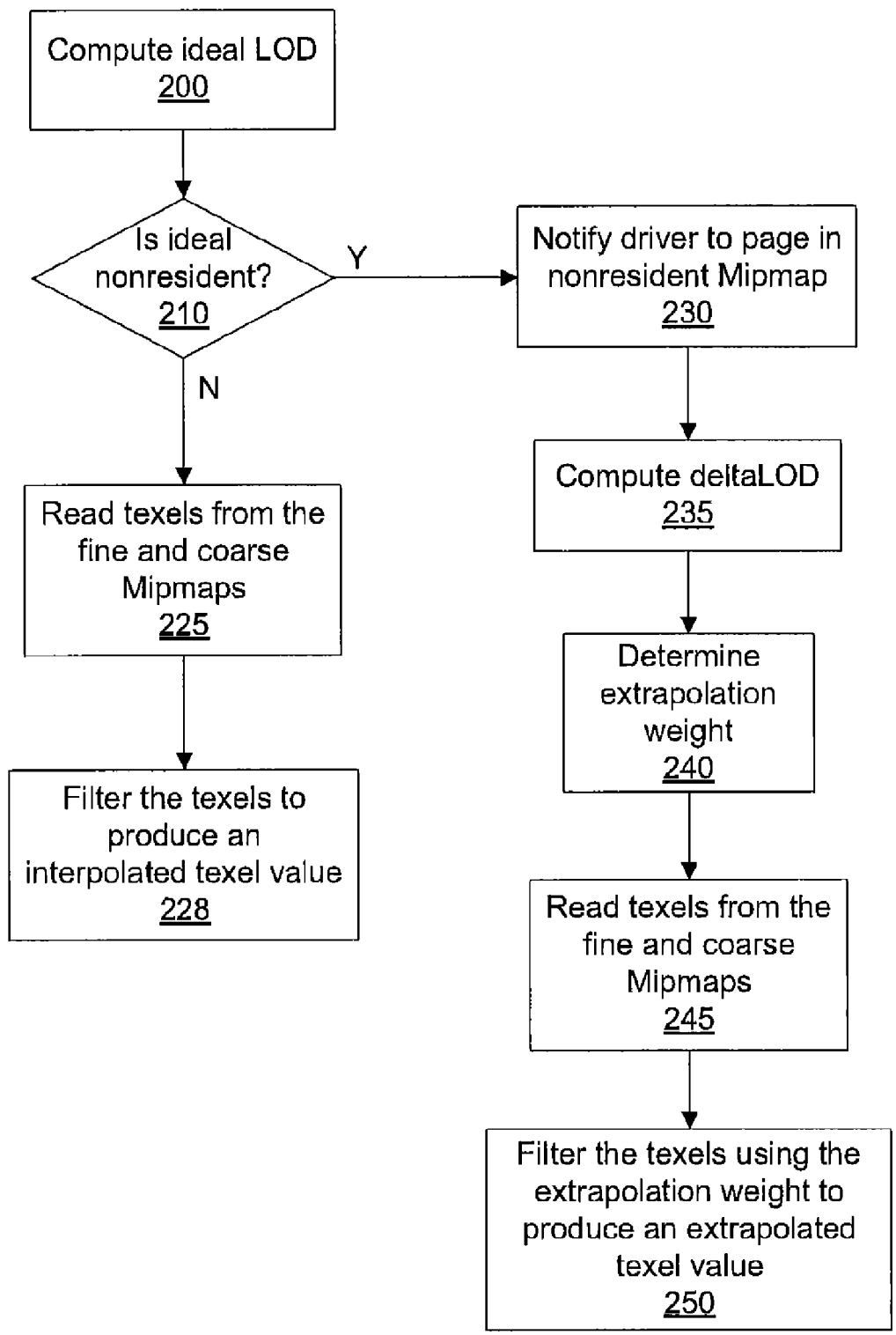
FIG. 2A is a flow diagram of method steps for producing an extrapolated texture value for a nonresident mipmap level in accordance with one or more aspects of the present invention.

For example, the computed LOD for texture mapping is LOD2 and LOD2 mipmap 130 is nonresident, extrapolated texture values are computed, as described in conjunction with FIG. 2A, using resident mipmaps, LOD3 mipmap 150 and LOD4 mipmap 160. The extrapolated texture values for a non-resident LOD, such as LOD2 are computed using an extrapolation minification filter. A minification filter is used when the ratio of texels to pixels is less than one. Once LOD2 is converted to a resident LOD mipmap, the filter weights may be adjusted to phase in the LOD2 texels over a number of frames to produce a smooth visual transition, rather than switching from an extrapolation filter to a conventional interpolation filter in a single frame. When the computed LOD is less than LOD0, i.e., higher resolution than LOD0, the extrapolated texture values are computed using an extrapolation magnification filter. A magnification filter is used when the ratio of texels to pixels is greater than one.

In conventional systems a technique known to those skilled in the art, "unsharp masking" or "sharpen texture" is used to enhance the sharpness of texture lookups when the computed LOD is less than zero, i.e., the desired texture resolution is higher than LOD0, by extrapolating between LOD0 and LOD1 to subtract out the contribution of the low-frequency components from LOD0. The present invention also uses extrapolation (magnification extrapolation) to produce texel values for computed LODs that are less than zero, but uses new extrapolation filter types, e.g., extrapolated mipmapped linear and extrapolated mipmapped nearest-neighbor. Additionally, minification extrapolation is performed to compute texture values for any nonresident textures, not just for LOD values below LOD0.

FIG. 2A is a flow diagram of method steps for producing an extrapolated texture value for a nonresident mipmap level, such as nonresident mipmaps 100, in accordance with one or more aspects of the present invention. In step 200 the method computes an ideal LOD, using techniques known to those skilled in the art. The integer portion of the ideal LOD corresponds to the mipmap level that best matches the resolution of the applied texture. In step 210 the method determines if the ideal LOD mipmap is a nonresident mipmap, and, if not, then the ideal LOD mipmap is resident, and in step 225 texels are read from the fine and coarse mipmaps. Details of step 210 are described in conjunction with FIG. 2B.

Conventionally, the fine mipmap corresponds to the integer portion of the ideal LOD mipmap and the coarse mipmap corresponds to the integer portion +1 LOD mipmap. In step 228 the method computes bilinearly filtered texel values for the fine and coarse mipmaps and then interpolates between the bilinearly filtered texel values using the fractional portion of the ideal LOD to produce a filtered texel value when the filter type is extrapolated mipmapped linear. When the filter type is extrapolated mipmapped nearest-neighbor, a nearest texel value is selected from the fine and coarse mipmaps to produce two point-sampled texel values. The two point-sampled texel values are then bilinearly interpolated using the fractional portion of the ideal LOD to produce the filtered texel value. Steps 225 and 228 are performed using conventional texture map filtering techniques.

If, in step 210 the method determines that the ideal LOD mipmap is a nonresident mipmap, then in step 230 the method notifies a device driver that one or more mipmaps for the texture should be paged into physical memory to convert those mipmaps from nonresident mipmaps to resident mipmaps for use in producing an image. In step 210 the method may determine that the ideal LOD mipmap is nonresident when the ideal LOD is less than zero and the LOD0 mipmap is not resident, indicating that the ratio of texels to pixels is greater than one and the extrapolated magnification filter should be used. The extrapolated minification filter should be used when the ideal LOD is greater than zero and the highest resident mipmap subtracted from the ideal LOD is less than zero, indicating that the ratio of texels to pixels is less than one. When the ideal LOD equals LOD0, the extrapolated magnification may be used.

In step 235 the method computes a deltaLOD as the difference between the ideal LOD and the extrapolation threshold LOD (a value greater than or equal to the LOD of the highest resolution resident mipmap), i.e., deltaLOD=ideal LOD−extrapolation threshold LOD. For example, referring to FIG. 1, when the ideal LOD is LOD1 (corresponding to LOD0 mipmap 120) the deltaLOD is −2, since extrapolation threshold LOD is LOD3 (corresponding to LOD3 mipmap 150). Note that deltaLOD may also have a fractional component since the ideal LOD and the extrapolation threshold LOD can have a fractional component.

In step 240 the method uses the deltaLOD to determine an extrapolation weight. A table stores extrapolation weight values corresponding to deltaLOD values. In some embodiments of the present invention, the table may be programmed to specify the function used to determine the extrapolation weight values. Some embodiments of the present invention allow up to 64 (LOD, weight) pairs to be loaded into the table in decreasing LOD order. By default this table contains six pairs {(0,0), (−1,0.25), (−2,0.5), (−4, 1.125), (−8, 2.0), (−16, 3.0)}

Given a deltaLOD that is less than −16, the last entry in the table(0), then the extrapolation weight will be the weight of the last entry of the table(3.0), i.e., 3. If deltaLOD is less than zero, but greater than the first entry in the table specified by the application, the extrapolation weight will be the weight of the first entry in the table. Given a deltaLOD value of −5 that falls between two LOD values in the table, a low value of (LOD=−4, weight=1.125) and a high value of (LOD=−8, weight=2.0), the extrapolation weight is linearly interpolated:

$$weight_{low}*(LOD_{high}-deltaLOD)/(LOD_{high}-LOD_{low})+ weight_{high}*(deltaLOD-LOD_{low})/(LOD_{high}-LOD_{low}). \quad \text{(eq. 1)}$$

The extrapolation weight is used in step 250 to produce a filtered texel using texels read from the coarse LOD mipmap and the fine LOD mipmap.

In step 245 the method reads four texels from the coarse LOD mipmap and four texels from the fine LOD mipmap, when the specified filter type is extrapolated mipmapped linear. When the specified filter type is extrapolated mipmapped nearest-neighbor, the method reads a single texel from the fine LOD mipmap and a single texel from the coarse LOD mipmap. The fine LOD mipmap is the mipmap whose level of detail is equal to the truncated extrapolation threshold LOD (the integer portion of the extrapolation threshold LOD) and the coarse LOD mipmap is a lower resolution resident mipmap that has an LOD equal to the fine LOD plus one.

In step 250, when the filter type is extrapolated mipmapped linear, the method bilinearly interpolates texels read from the coarse and fine LOD mipmaps using the fractional portions of the texture map coordinates to produce texel values, $T_{fine}$ and $T_{coarse}$. When the filter type is extrapolated mipmapped nearest-neighbor, the method provides the texel read from the fine LOD mipmap and $T_{fine}$ and the texel read from the coarse LOD mipmap as $T_{coarse}$. In step 250 the method then computes the extrapolated texel value using $T_{fine}$, $T_{coarse}$, and the extrapolation weight, W using the following equation:

$$T_{fine}*(1.0+W)-T_{coarse}*W. \quad \text{(eq. 2)}$$

The extrapolated texel value can be combined with additional extrapolated texel values to produce filtered texel values for anisotropic texture mapping or other filtered texture functions. The extrapolated texel value is then used to produce a rendered image that is stored and/or displayed.

Figure 2B:
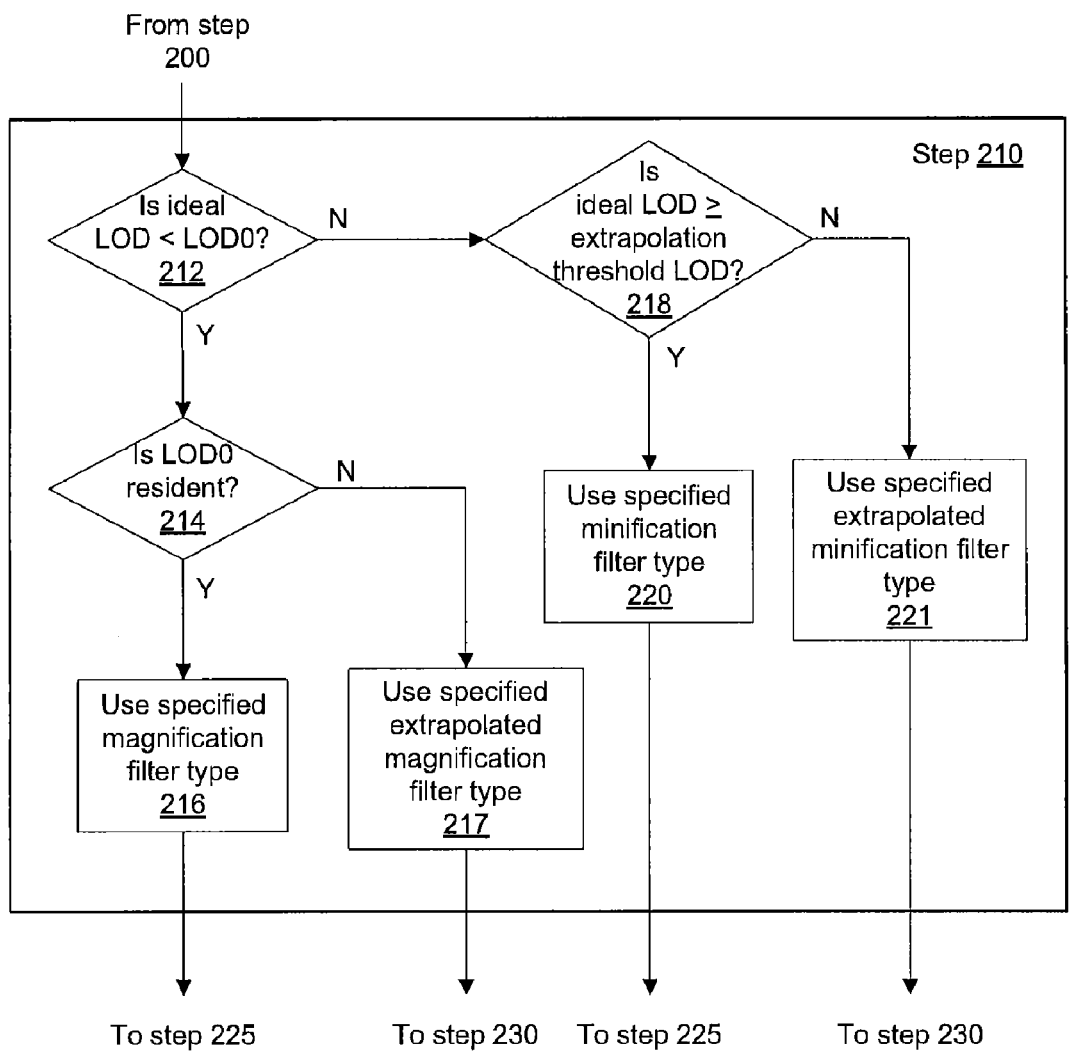
FIG. 2B is a flow diagram of method step 210 of FIG. 2A for determining whether or not a mipmap corresponding to an ideal LOD is resident in accordance with one or more aspects of the present invention.

FIG. 2B is a flow diagram of method step 210 of FIG. 2A for determining whether or not a mipmap corresponding to an ideal LOD is resident, in accordance with one or more aspects of the present invention. In step 212 the method determines is the ideal LOD is less than zero, i.e., lower than LOD0, and, if so, then in step 214 the method determines if LOD0 mipmap is a resident mipmap. If, in step 214 the method determines that the LOD0 mipmap is resident, then in step 216 the filter type specified for the magnification texture filter is used in step 228. If, in step 214 the method determines that the LOD0 mipmap is not resident, then in step 217 the filter type specified for the extrapolated magnification texture filter is used in step 250.

If, in step 212 the method determines if the ideal LOD is not less than zero, then in step 218 the method determines if the ideal LOD is greater than or equal to the extrapolation threshold LOD. If, in step 218 the method determines that the ideal LOD mipmap is greater than or equal to the extrapolation threshold LOD, then in step 220 the filter type specified for the minification texture filter is used to compute the filtered texel value using interpolation in step 228. Otherwise, in step 221, the filter type specified for the extrapolated minification texture filter is used to compute the filtered texel value using extrapolation in step 250.

Figure 2C:
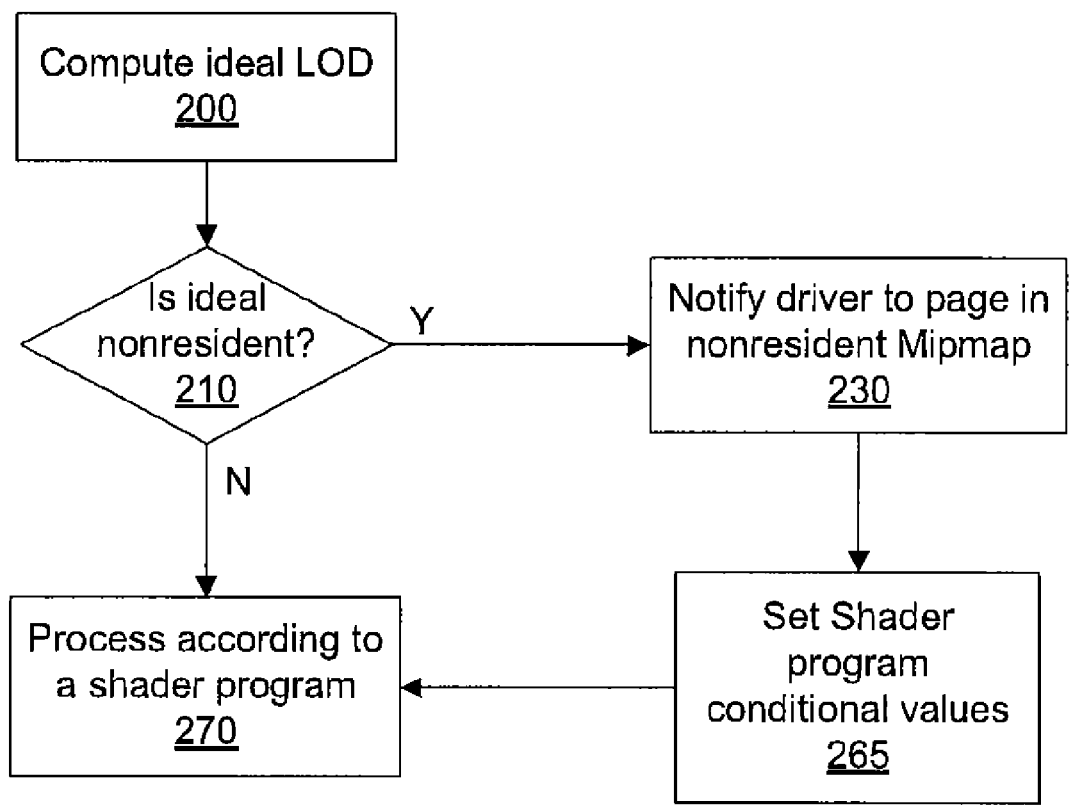
FIG. 2C is a flow diagram of method steps for determining whether or not a texture map value should be extrapolated from a resident mipmap level in accordance with one or more aspects of the present invention.

FIG. 2C is a flow diagram of method steps for determining whether or not a texel value should be extrapolated from a resident mipmap, in accordance with one or more aspects of the present invention. A shader program used to process graphics data can be configured using predicates or condition codes to determine subsequent branch behavior in the pixel shader program. Predicated or conditional instructions can by used to include conditional execution paths where one path is executed when a shader program predicate or condition code specified by an instruction has a first value and another path is executed when the shader program predicate or condition code has a different value. Steps 200, 210, and 230 are completed as described in conjunction with FIG. 2A. In step 265 the method sets a shader program conditional value (predicate or condition code) to indicate that the mipmap corresponding to the ideal LOD is a nonresident mipmap. In other embodiments of the present invention, the method also computes and stores the deltaLOD as a shader program conditional value. In step 270 shader program instructions are executed and interpolated or extrapolated texel values are computed. Specifically, when the default conditional value is used the shader program executes a first set of instructions for performing conventional interpolation to produce an interpolated texel value. When the shader program conditional value indicates that the ideal mipmap is a nonresident mipmap, a different set of instructions to produce an extrapolated texel value.

System Overview

Figure 3:
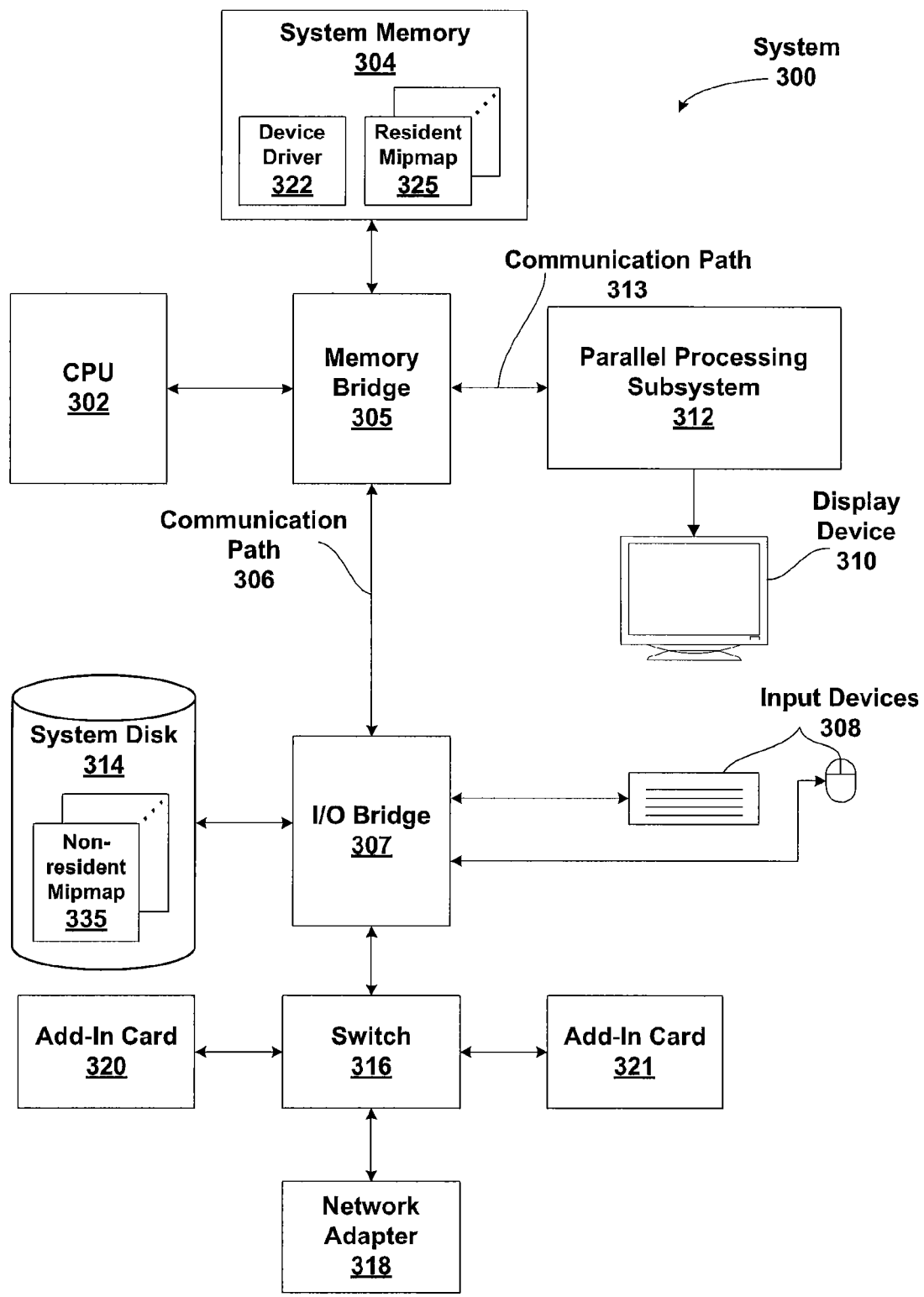
FIG. 3 is a block diagram illustrating a computer system configured to implement one or more aspects of the present invention.

FIG. 3 is a block diagram illustrating a computer system configured to implement one or more aspects of the present invention. FIG. 3 is a block diagram of a computer system 300 according to an embodiment of the present invention. Computer system 300 includes a central processing unit (CPU) 302 and a system memory 304 communicating via a bus path that includes a memory bridge 305. In some embodiments of the present invention, texture data, such as resident mipmaps 325, stored in system memory 304 are considered "resident" since that data can be provided to a parallel processing subsystem 312 with a deterministic latency. In other embodiments of the present invention, texture data stored in system memory 304 are considered "nonresident" since that data cannot be provided to parallel processing subsystem 312 with a reasonable latency. A reasonable latency is needed to support an interactive frame rate.

System memory 304 also includes a device driver 322 that is configured to provide an instruction stream that specifies the location of data, such as mipmaps, and program instructions to parallel processing subsystem 312. The program instructions and data are produced by a software application and may be stored in system memory 304 or memory within other devices of system 300. Device driver 322 is executed by CPU 302 to translate instructions for execution by parallel processing subsystem 312 based on the specific capabilities of parallel processing subsystem 312. The instructions may be specified by an application programming interface (API) which may be a conventional graphics API such as Direct3D or OpenGL.

Memory bridge 305, which may be, e.g., a Northbridge chip, is connected via a bus or other communication path 306 (e.g., a HyperTransport link) to an I/O (input/output) bridge 307. I/O bridge 307, which may be, e.g., a Southbridge chip, receives user input from one or more user input devices 308 (e.g., keyboard, mouse) and forwards the input to CPU 302 via path 306 and memory bridge 305. Parallel processing subsystem 312 is coupled to memory bridge 305 via a bus or other communication path 313 (e.g., a PCI Express, Accelerated Graphics Port, or HyperTransport link); in one embodiment parallel processing subsystem 312 is a graphics subsystem that delivers pixels to a display device 310 (e.g., a conventional CRT or LCD based monitor). A system disk 314 is also connected to I/O bridge 307. Some mipmaps, particularly high resolution levels that require more storage space, are stored in high latency storage, such as disk 314 or one a remote server, CD drive, DVD drive, or the like. These mipmaps, such as nonresident mipmaps 335 are loaded into a lower latency memory storage as needed to become resident mipmaps that can be accessed by parallel processing subsystem 312 during interactive rendering.

A switch 316 provides connections between I/O bridge 307 and other components such as a network adapter 318 and various add-in cards 320 and 321. Other components (not explicitly shown), including USB or other port connections, CD drives, DVD drives, film recording devices, and the like, may also be connected to I/O bridge 307. Communication paths interconnecting the various components in FIG. 3 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

Figure 4:
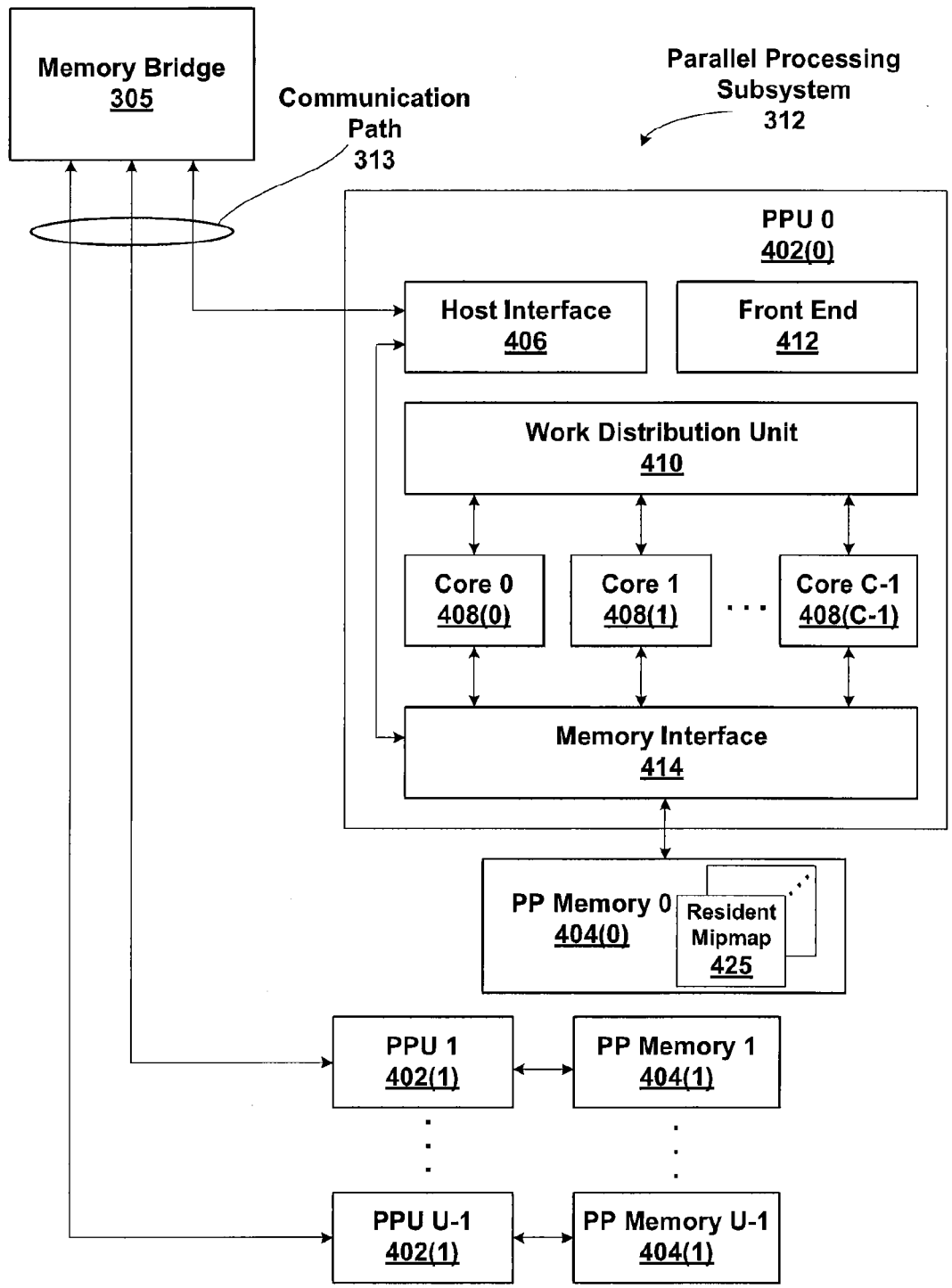
FIG. 4 is a block diagram of a parallel processing subsystem for the computer system of FIG. 3 in accordance with one or more aspects of the present invention.

An embodiment of parallel processing subsystem 312 is shown in FIG. 4. Parallel processing subsystem 312 includes one or more parallel processing units (PPUs) 402, each of which is coupled to a local parallel processing (PP) memory 404. In general, a parallel processing subsystem includes a number U of PPUs, where $U \geq 1$. (Herein, multiple instances of like objects are denoted with reference numbers identifying the object and parenthetical numbers identifying the instance where needed.) PPUs 402 and PP memories 404 may be implemented, e.g., using one or more integrated circuit devices such as programmable processors, application specific integrated circuits (ASICs), and memory devices.

As shown in detail for PPU 402(0), each PPU 402 includes a host interface 406 that communicates with the rest of system 300 via communication path 313, which connects to memory bridge 305 (or, in one alternative embodiment, directly to CPU 302). In one embodiment, communication path 313 is a PCI-E link, in which dedicated lanes are allocated to each PPU 402 as is known in the art. Other communication paths may also be used. Host interface 406 generates packets (or other signals) for transmission on communication path 313 and also receives all incoming packets (or other signals) from communication path 313 and directs them to appropriate components of PPU 402. For example, commands related to processing tasks may be directed to a front end unit 412 while commands related to memory operations (e.g., reading from or writing to PP memory 404) may be directed to a memory interface 414. Host interface 406, front end unit 412, and memory interface 414 may be of generally conventional design, and a detailed description is omitted as not being critical to the present invention.

Each PPU 402 advantageously implements a highly parallel processor. As shown in detail for PPU 402(0), a PPU 402 includes a number C of cores 408, where $C \geq 1$. Each processing core 408 is capable of executing a large number (e.g., tens or hundreds) of threads concurrently, where each thread is an instance of a program; one embodiment of a multithreaded processing core 408 is described below. Cores 408 receive processing tasks to be executed via a work distribution unit 410, which receives commands defining processing tasks from a front end unit 412. Work distribution unit 410 can implement a variety of algorithms for distributing work. For instance, in one embodiment, work distribution unit 410 receives a "ready" signal from each core 408 indicating whether that core has sufficient resources to accept a new processing task. When a new processing task arrives, work distribution unit 410 assigns the task to a core 408 that is asserting the ready signal; if no core 408 is asserting the ready signal, work distribution unit 410 holds the new processing task until a ready signal is asserted by a core 408. Those skilled in the art will recognize that other algorithms may also be used and that the particular manner in which work distribution unit 410 distributes incoming processing tasks is not critical to the present invention.

Cores 408 communicate with memory interface 414 to read from or write to various external memory devices. In one embodiment, memory interface 414 includes an interface adapted to communicate with local PP memory 404, as well as a connection to host interface 406, thereby enabling the cores to communicate with system memory 304 or other memory that is not local to PPU 402, including system disk 314. Memory interface 414 can be of generally conventional design, and a detailed description is omitted.

Cores 408 can be programmed to execute processing tasks relating to a wide variety of applications, including but not limited to linear and nonlinear data transforms, filtering of video and/or audio data, modeling operations (e.g., applying laws of physics to determine position, velocity and other attributes of objects), image rendering operations (e.g., vertex shader, geometry shader, and/or pixel shader programs), and so on. PPUs 402 may transfer data, such as resident mipmap 425, from system memory 304 and/or local PP memories 404 into internal (on-chip) memory, process the data, and write result data back to system memory 304 and/or local PP memories 404, where such data can be accessed by other system components, including, e.g., CPU 302 or another parallel processing subsystem 312.

Referring again to FIG. 3, in some embodiments, some or all of PPUs 402 in parallel processing subsystem 312 are graphics processors with rendering pipelines that can be configured to perform various tasks related to generating pixel data from graphics data supplied by CPU 302 and/or system memory 304 via memory bridge 305 and bus 313, interacting with local PP memory 404 (which can be used as graphics memory including, e.g., a conventional frame buffer and mipmaps) to store and update pixel data, delivering pixel data to display device 310, and the like. In some embodiments, PP subsystem 312 may include one or more PPUs 402 that operate as graphics processors and one or more other PPUs 402 that are used for general-purpose computations. The PPUs may be identical or different, and each PPU may have its own dedicated PP memory device(s) or no dedicated PP memory device(s).

In operation, CPU 302 is the master processor of system 300, controlling and coordinating operations of other system components. In particular, CPU 302 issues commands that control the operation of PPUs 402. In some embodiments, CPU 302 writes a stream of commands for each PPU 402 to a pushbuffer (not explicitly shown in FIG. 3), which may be located in system memory 304, PP memory 404, or another storage location accessible to both CPU 302 and PPU 402. PPU 402 reads the command stream from the pushbuffer and executes commands asynchronously with operation of CPU 302.

It will be appreciated that the system shown herein is illustrative and that variations and modifications are possible. The connection topology, including the number and arrangement of bridges, may be modified as desired. For instance, in some embodiments, system memory 304 is connected to CPU 302 directly rather than through a bridge, and other devices communicate with system memory 304 via memory bridge 305 and CPU 302. In other alternative topologies, parallel processing subsystem 312 is connected to I/O bridge 307 or directly to CPU 302, rather than to memory bridge 305. In still other embodiments, I/O bridge 307 and memory bridge 305 might be integrated into a single chip. The particular components shown herein are optional; for instance, any number of add-in cards or peripheral devices might be supported. In some embodiments, switch 316 is eliminated, and network adapter 318 and add-in cards 320, 321 connect directly to I/O bridge 307.

The connection of PPU 402 to the rest of system 300 may also be varied. In some embodiments, PP system 312 is implemented as an add-in card that can be inserted into an expansion slot of system 300. In other embodiments, a PPU 402 can be integrated on a single chip with a bus bridge, such as memory bridge 305 or I/O bridge 307. In still other embodiments, some or all elements of PPU 402 may be integrated on a single chip with CPU 302.

A PPU may be provided with any amount of local PP memory, including no local memory, and may use local memory and system memory in any combination. For instance, a PPU 402 can be a graphics processor in a unified memory architecture (UMA) embodiment; in such embodiments, little or no dedicated graphics (PP) memory is provided, and PPU 402 would use system memory exclusively or almost exclusively to store resident mipmaps 325. In UMA embodiments, a PPU may be integrated into a bridge chip or processor chip or provided as a discrete chip with a high-speed link (e.g., PCI-E) connecting the PPU to system memory, e.g., via a bridge chip.

As noted above, any number of PPUs can be included in a parallel processing subsystem. For instance, multiple PPUs can be provided on a single add-in card, or multiple add-in cards can be connected to communication path 313, or one or more of the PPUs could be integrated into a bridge chip. The PPUs in a multi-PPU system may be identical to or different from each other; for instance, different PPUs might have different numbers of cores, different amounts of local PP memory, and so on. Where multiple PPUs are present, they may be operated in parallel to process data at higher throughput than is possible with a single PPU.

Systems incorporating one or more PPUs may be implemented in a variety of configurations and form factors, including desktop, laptop, or handheld personal computers, servers, workstations, game consoles, embedded systems, and so on.

Core Overview

Figure 5:
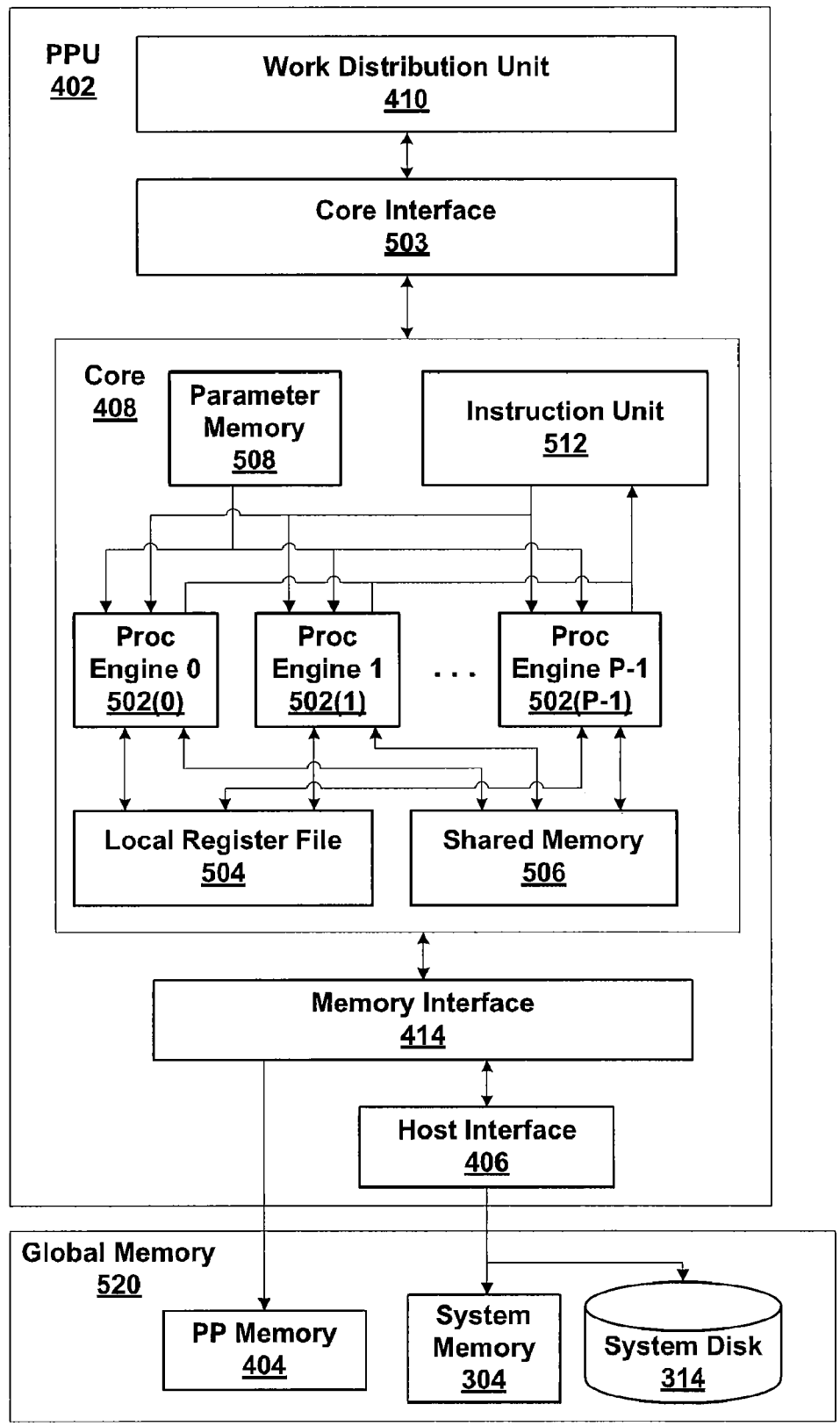
FIG. 5 is a block diagram of a parallel processing unit for the parallel processing subsystem of FIG. 4 in accordance with one or more aspects of the present invention.

FIG. 5 is a block diagram of a parallel processing unit 420 for the parallel processing subsystem 312 of FIG. 4, in accordance with one or more aspects of the present invention. PPU 402 includes a core 408 (or multiple cores 408) configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units.

In one embodiment, each core 408 includes an array of P (e.g., 8, 16, etc.) parallel processing engines 502 configured to receive SIMD instructions from a single instruction unit 512. Each processing engine 502 advantageously includes an identical set of functional units (e.g., arithmetic logic units, etc.). The functional units may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

Each processing engine 502 uses space in a local register file (LRF) 504 for storing its local input data, intermediate results, and the like. In one embodiment, local register file 504 is physically or logically divided into P lanes, each having some number of entries (where each entry might store, e.g., a 32-bit word). One lane is assigned to each processing engine 502, and corresponding entries in different lanes can be populated with data for different threads executing the same program to facilitate SIMD execution. In some embodiments, each processing engine 502 can only access LRF entries in the lane assigned to it. The total number of entries in local register file 504 is advantageously large enough to support multiple concurrent threads per processing engine 502.

Each processing engine 502 also has access to an on-chip shared memory 506 that is shared among all of the processing engines 502 in core 408. Shared memory 506 may be as large as desired, and in some embodiments, any processing engine 502 can read to or write from any location in shared memory 506 with equally low latency (e.g., comparable to accessing local register file 504). In some embodiments, shared memory 506 is implemented as a shared register file; in other embodiments, shared memory 506 can be implemented using shared cache memory.

In addition to shared memory 506, some embodiments also provide additional on-chip parameter memory and/or cache(s) 508, which may be implemented, e.g., as a conventional RAM or cache. Parameter memory/cache 508 can be used, e.g., to hold state parameters and/or other data (e.g., various constants) that may be needed by multiple threads. Processing engines 502 also have access via memory interface 414 to off-chip "global" memory 520, which can include, e.g., PP memory 404 and/or system memory 304, with system memory 304 being accessible by memory interface 414 via host interface 406 as described above.

It is to be understood that any memory external to PPU 402 may be used as global memory 520. As shown in FIG. 5, global memory 520 includes PP memory 404, system memory 304, and system disk 314. As previously described Texture data stored in global memory 520, such as resident mipmaps 325 and 425 are considered resident texture data and other texture data stored in global memory 520, such as nonresident mipmaps 335 are considered nonresident texture data. As nonresident texture data is copied from system disk 314 to system memory 304 or PP memory 404, the texture data becomes resident texture data. A driver program executing on CPU 302 of FIG. 3 can be used to specify which mipmaps are resident mipmaps and which mipmaps are nonresident. In other embodiments of the present invention, whether a mipmap is resident or nonresident is determined based on at least a portion of the texel address. Processing engines 502 can be coupled to memory interface 414 via an interconnect (not explicitly shown) that allows any processing engine 502 to access global memory 520.

In one embodiment, each processing engine 502 is multithreaded and can execute up to some number G (e.g., 24) of threads concurrently, e.g., by maintaining current state information associated with each thread in a different portion of its assigned lane in local register file 504. Processing engines 502 are advantageously designed to switch rapidly from one thread to another so that instructions from different threads can be issued in any sequence without loss of efficiency.

Instruction unit 512 is configured such that, for any given processing cycle, the same instruction (INSTR) is issued to all P processing engines 502. Thus, at the level of a single clock cycle, core 408 implements a P-way SIMD microarchitecture. Since each processing engine 502 is also multithreaded, supporting up to G threads concurrently, core 408 in this embodiment can have up to P*G threads executing concurrently. For instance, if P=16 and G=24, then core 408 supports up to 584 concurrent threads.

Because instruction unit 512 issues the same instruction to all P processing engines 502 in parallel, core 408 is advantageously used to process threads in "SIMD thread groups." As used herein, a "SIMD thread group" refers to a group of up to P threads of execution of the same program on different input data, with one thread of the group being assigned to each processing engine 502. A SIMD thread group may include fewer than P threads, in which case some of processing engines 502 will be idle during cycles when that SIMD thread group is being processed. A SIMD thread group may also include more than P threads, in which case processing will take place over consecutive clock cycles. Since each processing engine 502 can support up to G threads concurrently, it follows that up to G SIMD thread groups can be executing in core 408 at any given time.

On each clock cycle, one instruction is issued to all P threads making up a selected one of the G SIMD thread groups. To indicate which thread is currently active, an "active mask" for the associated thread may be included with the instruction. Processing engine 502 uses the active mask as a context identifier, e.g., to determine which portion of its assigned lane in local register file 504 should be used when executing the instruction. Thus, in a given cycle, all processing engines 502 in core 408 are nominally executing the same instruction for different threads in the same SIMD thread group. (In some instances, some threads in a SIMD thread group may be temporarily idle, e.g., due to conditional or predicated instructions, divergence at branches in the program, or the like.)

Operation of core 408 is advantageously controlled via a core interface 503. In some embodiments, core interface 503 receives data to be processed (e.g., primitive data, vertex data, and/or pixel data) as well as state parameters and commands defining how the data is to be processed (e.g., what program is to be executed) from work distribution unit 410. Threads or SIMD thread groups can be launched by other threads or by fixed-function units such as triangle rasterizers. Core interface 503 can load data to be processed into shared memory 506 and parameters into parameter memory 508. Core interface 503 also initializes each new thread or SIMD thread group in instruction unit 512, then signals instruction unit 512 to begin executing the threads. When execution of a thread or SIMD thread group is completed, core 408 advantageously notifies core interface 503. Core interface 503 can then initiate other processes, e.g., to retrieve output data from shared memory 506 and/or to prepare core 408 for execution of additional threads or SIMD thread groups.

It will be appreciated that the core architecture described herein is illustrative and that variations and modifications are possible. Any number of processing engines may be included. In some embodiments, each processing engine has its own local register file, and the allocation of local register file entries per thread can be fixed or configurable as desired. Further, while only one core 408 is shown, a PPU 402 may include any number of cores 408, which are advantageously of identical design to each other so that execution behavior does not depend on which core 408 receives a particular processing task. Each core 408 advantageously operates independently of other cores 408 and has its own processing engines, shared memory, and so on.

Thread Arrays and Cooperative Thread Arrays

In some embodiments, multithreaded processing core 408 of FIG. 5 can execute general-purpose computations using thread arrays. As used herein, a "thread array" is a group consisting of a number (n0) of threads that concurrently execute the same program on an input data set to produce an output data set. Each thread in the thread array is assigned a unique thread identifier ("thread ID") that is accessible to the thread during its execution. The thread ID controls various aspects of the thread's processing behavior. For instance, a thread ID may be used to determine which portion of the input data set a thread is to process and/or to determine which portion of an output data set a thread is to produce or write.

In some embodiments, the thread arrays are "cooperative" thread arrays, or CTAs. As with other types of thread arrays, a CTA is a group of multiple threads that concurrently execute the same program (referred to herein as a "CTA program") on an input data set to produce an output data set. In a CTA, the threads can cooperate by sharing data with each other in a manner that depends on thread ID. For instance, in a CTA, data can be produced by one thread and consumed by another. In some embodiments, synchronization instructions can be inserted into the CTA program code at points where data is to be shared to ensure that the data has actually been produced by the producing thread before the consuming thread attempts to access it. The extent, if any, of data sharing among threads of a CTA is determined by the CTA program; thus, it is to be understood that in a particular application that uses CTAs, the threads of a CTA might or might not actually share data with each other, depending on the CTA program.

In some embodiments, threads in a CTA share input data and/or intermediate results with other threads in the same CTA using shared memory 506 of FIG. 5. For example, a CTA program might include an instruction to compute an address in shared memory 506 to which particular data is to be written, with the address being a function of thread ID. Each thread computes the function using its own thread ID and writes to the corresponding location. The address function is advantageously defined such that different threads write to different locations; as long as the function is deterministic, the location written to by any thread is predictable. The CTA program can also include an instruction to compute an address in shared memory 506 from which data is to be read, with the address being a function of thread ID. By defining suitable functions and providing synchronization techniques, data can be written to a given location in shared memory 506 by one thread of a CTA and read from that location by a different thread of the same CTA in a predictable manner. Consequently, any desired pattern of data sharing among threads can be supported, and any thread in a CTA can share data with any other thread in the same CTA.

CTAs (or other types of thread arrays) are advantageously employed to perform computations that lend themselves to a data-parallel decomposition. As used herein, a "data-parallel decomposition" includes any situation in which a computational problem is solved by executing the same algorithm multiple times in parallel on input data to generate output data; for instance, one common instance of data-parallel decomposition involves applying the same processing algorithm to different portions of an input data set in order to generate different portions an output data set. Examples of problems amenable to data-parallel decomposition include matrix algebra, linear and/or nonlinear transforms in any number of dimensions (e.g., Fast Fourier Transforms), and various filtering algorithms including convolution filters in any number of dimensions, separable filters in multiple dimensions, and so on. The processing algorithm to be applied to each portion of the input data set is specified in the CTA program, and each thread in a CTA executes the same CTA program on one portion of the input data set. A CTA program can implement algorithms using a wide range of mathematical and logical operations, and the program can include conditional or branching execution paths and direct and/or indirect memory access. As previously described in conjunction with FIG. 2B, a shader program used to process graphics data can be configured to include conditional execution paths using predicated or conditional instructions. For example, based on a computed deltaLOD value a predicate or condition code is determined that causes the shader program to execute instructions for performing extrapolation to produce a filtered texel value. For another value of the predicate or condition code, the shader program executes instructions for performing conventional interpolation to produce a filtered texel value.

In one embodiment, a driver program executing on CPU 302 of FIG. 3 writes commands defining the CTA to a pushbuffer (not explicitly shown) in memory (e.g., system memory 304), from which the commands are read by a PPU 402. The commands advantageously are associated with state parameters such as the number of threads in the CTA, the location in global memory 520 of an input data set to be processed using the CTA, which mipmaps are resident for a texture, the location in global memory 520 of the CTA program to be executed, and the location in global memory 520 where output data is to be written. The state parameters may be written to the pushbuffer together with the commands. In response to the commands, core interface 503 loads the state parameters into core 408 (e.g., into parameter memory 508), then begins launching threads until the number of threads specified in the CTA parameters have been launched. In one embodiment, core interface 503 assigns thread IDs sequentially to threads as they are launched. More generally, since all threads in a CTA execute the same program in the same core 408, any thread can be assigned any thread ID, as long as each valid thread ID is assigned to only one thread. Any unique identifier (including but not limited to numeric identifiers) can be used as a thread ID. In one embodiment, if a CTA includes some number ($n_0$) of threads, thread IDs are simply sequential (one-dimensional) index values from 0 to $n_0-1$. In other embodiments, multidimensional indexing schemes can be used. It should be noted that as long as data sharing is controlled by reference to thread IDs, the particular assignment of threads to processing engines will not affect the result of the CTA execution. Thus, a CTA program can be independent of the particular hardware on which it is to be executed.

Graphics Pipeline Architecture

Figure 6A:
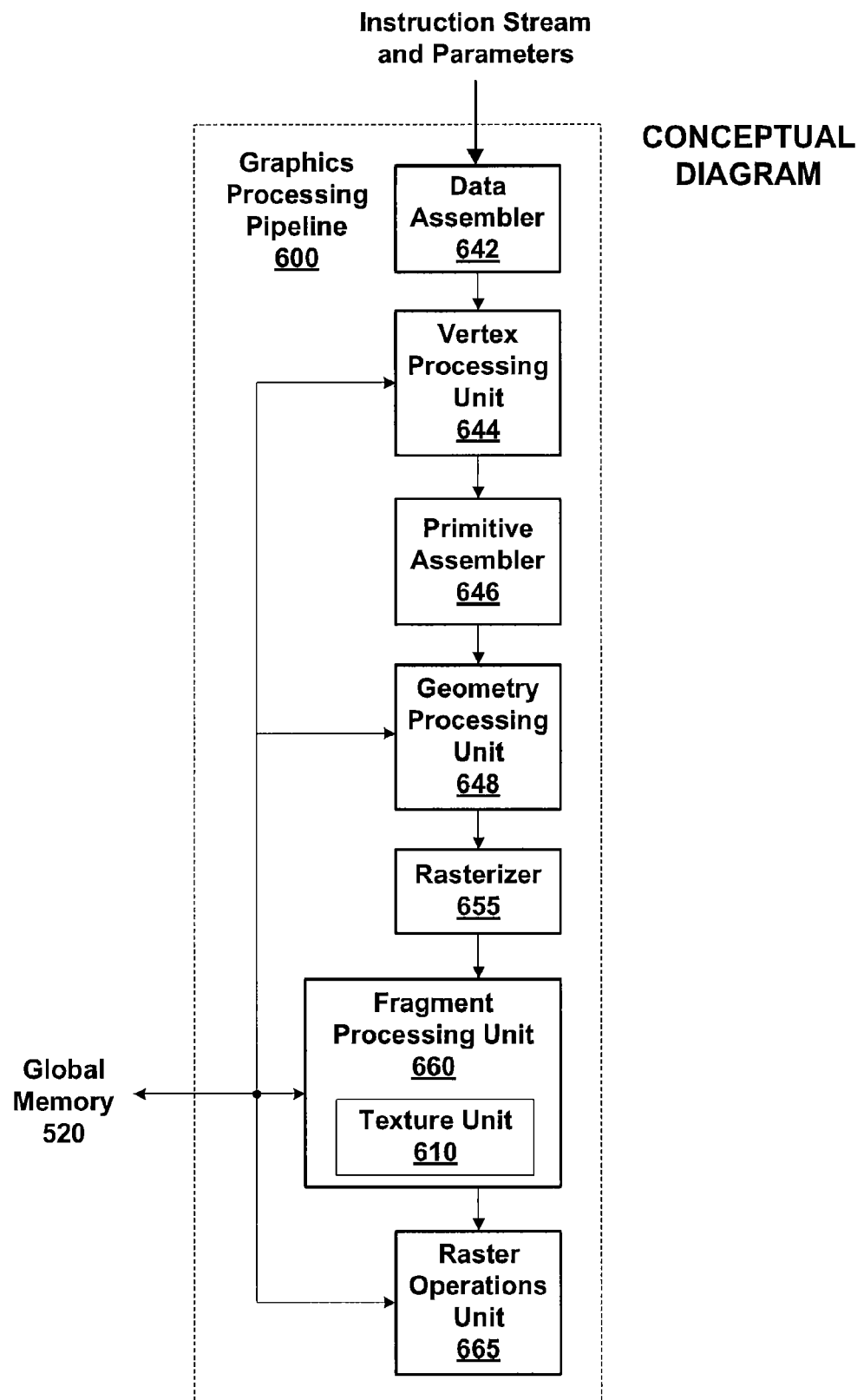
FIG. 6A is a conceptual diagram of a graphics processing pipeline in accordance with one or more aspects of the present invention.

FIG. 6A is a conceptual diagram of a graphics processing pipeline 600, in accordance with one or more aspects of the present invention. PPU 402 of FIG. 4 may be configured to form a graphics processing pipeline 600. For example, core 408 may be configured to perform the functions of a vertex processing unit 644, geometry processing unit 648, and a fragment processing unit 660. The functions of data assembler 642, primitive assembler 646, rasterizer 655, and raster operations unit 665 may also be performed by core 408 or may be performed by host interface 406.

Data assembler 642 collects vertex data for high-order surfaces, primitives, and the like, and outputs the vertex data to vertex processing unit 644. Vertex processing unit 644 is a programmable execution unit that is configured to execute vertex shader programs, transforming vertex data as specified by the vertex shader programs. For example, vertex processing unit 644 may be programmed to transform the vertex data from an object-based coordinate representation (object space) to an alternatively based coordinate system such as world space or normalized device coordinates (NDC) space. Vertex processing unit 644 may read data that is stored in PP memory 404 through memory interface 414 for use in processing the vertex data.

Primitive assembler 646 receives processed vertex data from vertex processing unit 644 and constructs graphics primitives, e.g., points, lines, triangles, or the like, for processing by geometry processing unit 648. Geometry processing unit 648 is a programmable execution unit that is configured to execute geometry shader programs, transforming graphics primitives received from primitive assembler 646 as specified by the geometry shader programs. For example, geometry processing unit 648 may be programmed to subdivide the graphics primitives into one or more new graphics primitives and calculate parameters, such as plane equation coefficients, that are used to rasterize the new graphics primitives. Geometry processing unit 648 outputs the parameters and new graphics primitives to rasterizer 655. Geometry processing unit 648 may read data that is stored in PP memory 404 through memory interface 414 for use in processing the geometry data.

Rasterizer 655 scan converts the new graphics primitives and outputs fragments and coverage data to fragment processing unit 660. Fragment processing unit 660 is a programmable execution unit that is configured to execute fragment shader programs, transforming fragments received from rasterizer 655 as specified by the fragment shader programs. For example, fragment processing unit 660 and texture unit 610 may be programmed to perform operations such as perspective correction, texture mapping, mipmap extrapolation, shading, blending, and the like, to produce shaded fragments that are output to raster operations unit 665. Fragment processing unit 660 and texture unit 610 may also be programmed to perform performs texture filtering operations, e.g., bilinear, trilinear, anisotropic, and the like.

Fragment processing unit 660 may read data that is stored in PP memory 404 through memory interface 414 for use in processing the fragment data. Memory interface 414 produces read requests for data stored in graphics memory and decompresses any compressed data. Raster operations unit 665 is a fixed function unit that optionally performs near and far plane clipping and raster operations, such as stencil, z test, and the like, and outputs pixel data as processed graphics data for storage in graphics memory. The processed graphics data may be stored in graphics memory for display on display device 310.

Texture Unit

Figure 6B:
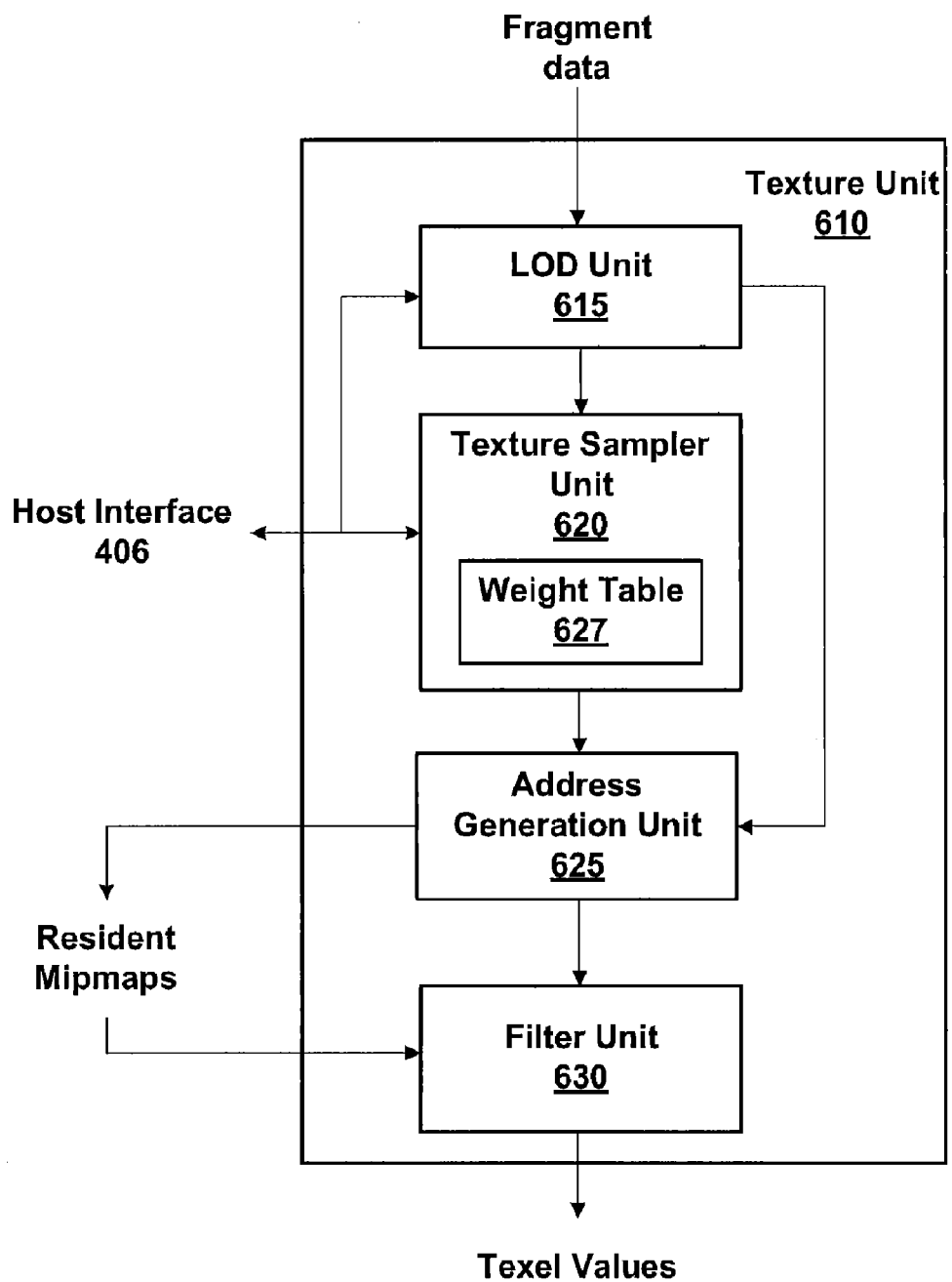
FIG. 6B is a block diagram of the texture unit of FIG. 6A in accordance with one or more aspects of the present invention.

FIG. 6B is a block diagram of texture unit 610 of FIG. 6A, in accordance with one or more aspects of the present invention. Texture unit 610 includes an LOD unit 615, texture sampler unit 620, an address generation unit 625 and a filter unit 630. Texture unit 610 receives fragment data for processing, including a texture map identifier and texture map coordinates, e.g., s, t, or the like. The texture map coordinates are processed by LOD unit 615, using techniques known to those skilled in the art to determine the ideal LOD (step 200 of FIGS. 2A and 2C).

The application specifies the filter type for each of the texture filters as members of the texture image state data structure. The texture filters include those common in the state of the art (magnification and minification) and two new texture filters: extrapolated magnification and extrapolated minification. The filter types include those common in the state of the art (nearest-neighbor, linear, mipmapped nearest-neighbor with nearest mipfiltering, mipmapped nearest-neighbor with linear mipfiltering, mipmapped linear with nearest mipfiltering, mipmapped linear with linear mipfiltering, and transparent black). The transparent black filter type does no filtering and simply returns R=G=B=A=0 which is useful when a predicate value or condition code causes a shader program to take alternate action. In the OpenGL graphics API (applications programming interface) these filter types are referred to as GL_NEAREST, GL_LINEAR, GL_NEAREST_MIPMAP_NEAREST, GL_NEAREST_MIPMAP_LINEAR, GL_LINEAR_MIPMAP_NEAREST, GL_LINEAR_MIPMAP_LINEAR. Additional new filter types that may be specified to improve image quality for the extrapolated magnification and extrapolated minification filters are: extrapolated mipmapped nearest-neighbor and extrapolated mipmapped linear.

Device driver 322 provides LOD unit 615 with information needed to determine whether or not an LOD corresponds to a resident or nonresident mipmap. This information is the extrapolation threshold LOD that is stored in the texture image data structure and provided to LOD unit 615. In the preferred embodiment of the present invention, the extrapolation threshold LOD is a real number stored in the texture image data structure representing the level of detail (including fractional bits) below which extrapolation magnification or extrapolation minification filtering is selected. The extrapolation threshold LOD allows driver 322 to smoothly transition from extrapolated filtering to interpolated filtering instead of abruptly snapping to a new resident mipmap resolution when new mipmap levels are converted from nonresident mipmaps to resident mipmaps. In an alternative embodiment of the present invention, the extrapolation threshold LOD is an integer value representing the lowest LOD resident mipmap level stored in the texture image data structure.

LOD unit 615 performs step 210 (of FIGS. 2A, 2B, and 2C) by comparing the ideal LOD with the extrapolation threshold LOD to select which texture filter, e.g., magnification, minification, extrapolated magnification, or extrapolated minification, will be employed by texture sampler unit 620 to sample and filter the texture image. LOD unit 615 passes the texture filter, selected texture type, ideal LOD, texture map coordinates, and other sampling parameters common in the state of the art to texture sampler unit 620. Additionally, LOD unit 615 outputs the texture filter type and texture map identifier to address generation unit 625.

If LOD unit 615 selects the texture filter type specified for the extrapolated minification or extrapolated magnification texture filter, then LOD unit 615 notifies device driver 322 (of FIG. 3) via host interface 406 (of FIG. 4) that the application has requested filtering of texels from a nonresident mipmap level and specifies the requested mipmap level. Device driver 322 initiates a conversion of the nonresident mipmap to a resident mipmap, as described in conjunction with FIG. 7.

If the selected texture filter is extrapolated magnification or extrapolated minification, then texture sampler unit 620 computes the deltaLOD (step 235 of FIGS. 2A and 2C) by computing the difference between the idealLOD and extrapolation threshold LOD. Texture sampler unit 620 then computes the extrapolation weight as a function of deltaLOD.

In one embodiment of the present invention, texture sampler unit 620 includes a weight table 627 containing (LOD, weight) pairs stored in order of decreasing LOD (positive to negative). If deltaLOD is less than the lowest LOD value in weight table 627, then the weight value from the entry in the table with the lowest LOD is selected as the extrapolation weight. If deltaLOD is greater than the largest LOD value in weight table 627, then the weight value from the entry in the table with the highest LOD is selected as the extrapolation weight. If deltaLOD is equal to the LOD value of an entry in weight table 627, then that entry's weight value is selected as the extrapolation weight. In some embodiments of the present invention, if deltaLOD is between two entries in weight table 627, then the extrapolation weight is computed via linear interpolation using the two nearest weight values. In other embodiments of the present invention, if deltaLOD is between the LOD values of two adjacent entries in weight table 627, then the extrapolatin weight is computed using a Catmull-Rom cubic spline or any other interpolating spline known to those skilled in the state of the art.

In some embodiments of the present invention, the contents of weight table 627 are static. In other embodiments of the present invention, device driver 322 loads weight table 627 according to an extrapolation filter specified by an application program. In other embodiments of the present invention, device driver 322 loads weight table 627 (or separate weight tables for extrapolated magnification and extrapolated minification) into the texture sampler data structure. The texture sampler data structure may be stored in registers within PPU 402 or the texture sample data structure may be stored in PP memory 404 and cached within PPU 402.

If the ideal LOD corresponds to a resident mipmap level, then texture sampler unit 620 selects the fine (and if necessary, coarse) mipmap level(s) and samples the pixel footprint on the selected mipmap level(s) using the selected texture filter type, using techniques known to those skilled in the art to produce an interpolated texel value. The lodweight corresponds to the fractional portion of the ideal LOD. If the ideal LOD corresponds to a nonresident mipmap level, then texture sampler unit 620 truncates the extrapolation threshold value (which is usually the lowest LOD resident mipmap level and highest resolution resident mipmap level) to produce an integer portion of the extrapolation threshold value. The integer portion is the fine mipmap level LOD (LODfine) and the fine mipmap level +1 (which is usually the second lowest LOD resident mipmap level and next-highest resolution resident mipmap level) is the coarse mipmap level LOD (LODcoarse).

When the filter type is extrapolated mipmapped nearest-neighbor, texture sampler unit 620 samples the pixel footprint in texture space, outputting nearest-neighbor samples on miplevels LODfine, and LODcoarse (corresponding to lowestResidentMipmap and lowestResidentMipmap+1) to address generation unit 625. When the filter type is extrapolated mipmapped linear, texture sampler unit 620 samples the pixel footprint in texture space outputting samples on miplevels LODfine, and LODcoarse (corresponding to lowestResidentMipmap and lowestResidentMipmap+1) to address generation unit 625. Texture sampler unit 620 uses the 1+extrapolation weight as the lodweight for sampling the LODfine miplevel and−extrapolation weight as the lodweight for sampling the LODcoarse miplevel when the filter type is extrapolated mipmapped linear or extrapolated mipmapped nearest-neighbor.

The selected filter type, lodweight, anisotropic weight, fine mipmap LOD level (LODfine), the coarse mipmap LOD level (LODcoarse), and samples (corresponding to the texture map coordinates and selected filter type) are output by texture sampler unit 620 to address generation unit 625. Address generation unit 625 generates uv weights (bilinear or nearest-neighbor) for each texel according to the selected filter type using techniques known to those skilled in the art. If the filter type of the sample is extrapolated mipmapped linear, address generation unit 625 computes bilinear (u,v) weights for the texels within each sample. If the filter type of the sample is extrapolated mipmapped nearest, address generation unit 625 computes nearest-neighbor weights for the texels within each sample. Address generation unit 625 uses the samples, texture map identifier, LODfine, and LODcoarse to determine addresses to read texels from the resident mipmaps. When virtual memory addressing is used, an additional address conversion may be performed by memory interface 414 to determine the physical addresses needed to read the texels.

In one embodiment of the present invention, each texel weight that is used to scale a texel read from a mipmap is the combination of the lodweight of the texel's miplevel, the anisotropic filter weight for the footprint (anisoweight), and uv weights. Address generation unit 625 computes a texel weight by multiplying the lodweight by the anisoweight by the texel uv weight and passes the result down to the Texture Filter unit 630. The texels are returned to filter unit 630 and scaled by the texel weights computed by address generation unit 625.

In embodiments of the present invention with filter weights that sum to unity, filter unit 630 accumulates the scaled texel values into a texture color accumulator register. When the last texel of the last pixel has been weighted and accumulated, texture unit 610 returns the contents of the texture color accumulator register to the fragment Processing unit 660. In embodiments of the present invention with filter weights that do not sum to unity, filter unit 630 accumulates the scaled texel values into a texture color accumulator register and accumulates the texel weights into a texture weight accumulation register. When the last texel has been weighted and accumulated, filter unit 630 divides the contents of the color accumulator register by the contents of the weight accumulator register and returns resulting filtered texture value to fragment processing unit 660.

Texture unit 610 can be configured to return per-pixel status information in a manner that is advantageously accessible by the pixel shader program for selecting conditional execution paths. In one embodiment of the present invention, texture unit 610 can convey on a per-pixel basis whether the act of texturing the pixel required texture unit 610 to employ extrapolation filtering and the resulting values set predicates or condition codes which can be used to determine subsequent branch behavior in the pixel shader program. The shader program can conditionally handle texels of nonresident mipmaps with additional texture reads from the same texture to perform cubic filtering, or issue texture reads from other textures to add synthetic detail, or perform other operations.

Figure 7:
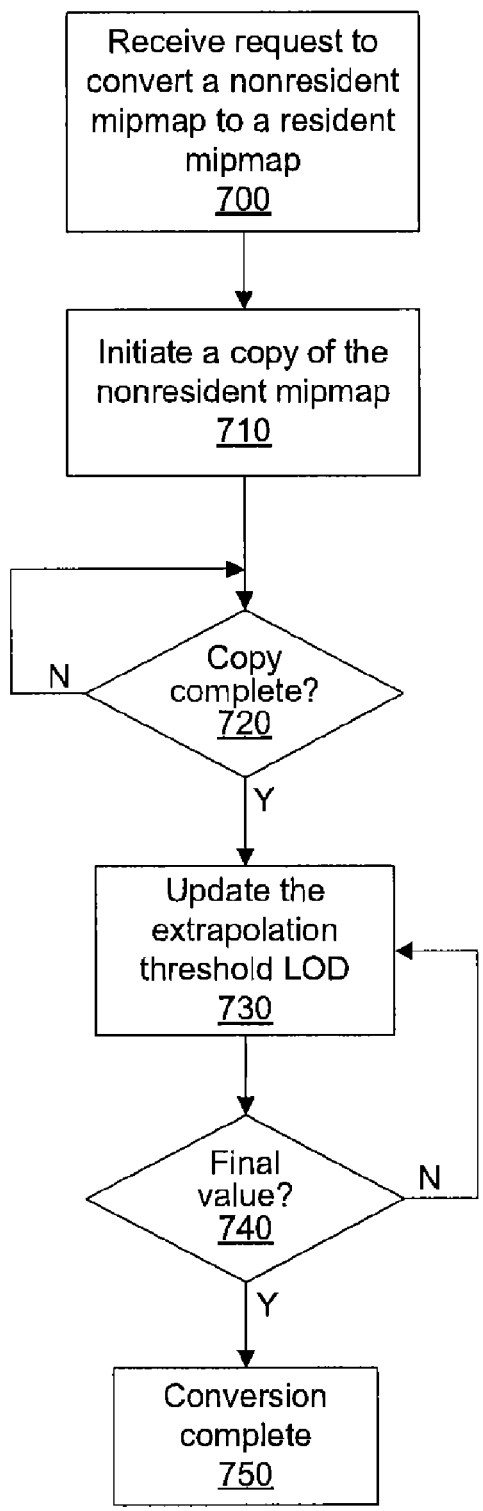
FIG. 7 is a flow diagram of method steps for converting a nonresident mipmap level to a resident mipmap level in accordance with one or more aspects of the present invention.

FIG. 7 is a flow diagram of method steps for converting a nonresident mipmap level to a resident mipmap level, in accordance with one or more aspects of the present invention. In step 700 device driver 322 receives a request to convert a nonresident mipmap to a resident mipmap. In step 710 device driver 322 initiates a copy of the nonresident mipmap to a resident memory that is accessible by texture unit 610, such as PP memory 404. In step 720 device driver 322 determines if the conversion is complete, i.e., the mipmap has been copied, and if not, step 720 is repeated. In some embodiments of the present invention, a resource manager may indicate when the highest resolution resident mipmap level has changed to confirm that the copy of the nonresident mipmap is complete.

Once the mipmap has been copied, in step 730 device driver 322 updates the extrapolation threshold LOD. In some embodiments of the present invention, the extrapolation threshold is updated to equal the value of the lowest resident mipmap level. In other embodiments of the present invention, the extrapolation threshold LOD is reduced over several frames to smoothly transition from extrapolated filtering to interpolated filtering instead of abruptly snapping to a new resident mipmap resolution the nonresident mipmap level is converted to a resident mipmap level. For example, an extrapolation threshold LOD of 3.0 may be successively reduced by 0.1 until a value of 2.0 is reached that equals the lowest resident mipmap level. In step 740 device driver 322 determines if the final value of the extrapolation threshold LOD has been reached, and, if not, step 730 is repeated. Otherwise, in step 750 the conversion of the nonresident mipmap level to a resident mipmap level is complete.

When extrapolation filtering is enabled and texels required for filtering come from nonresident mipmap levels, texels produced using extrapolated filtering provide an improved image that appears sharper in proportion to the difference between the ideal miplevel and the resident miplevel. This conveys a more appropriate degree of detail compared with using the low resolution mipmap texture data in place of the high resolution mipmap texture data. Parallel processing subsystem 312 is configured to extrapolate detail from resident mipmaps in parallel for processing multiple threads to produce extrapolated texture values while high resolution mipmaps, e.g., nonresident mipmap 325 and 335, are retrieved from nonresident memory, e.g., system disk 314, system memory 304, and the like.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A computer-implemented method for extrapolating between resident mipmap levels of a texture map to produce texel values for a nonresident mipmap level of the texture map, comprising:
   computing an ideal level of detail (LOD) corresponding to an ideal mipmap level;
   computing a deltaLOD as a difference between the ideal LOD and an extrapolation threshold LOD that is a value greater than or equal to an LOD of a highest resolution resident mipmap level of the texture map that is stored in a memory;
   determining an extrapolation weight based on the delta-LOD;
   computing, by a processing unit, an extrapolated texel value that approximates a texel value of the ideal mipmap level using the extrapolation weight, first texel values from a mipmap whose LOD equals an integer portion of the extrapolation threshold LOD, and second texel values from a next-highest resolution resident mipmap level that is stored in the memory; and
   producing an image suitable for display using the extrapolated texel value.

2. The method of claim 1, further comprising the step of setting a shader program conditional value based on the ideal LOD.

3. The method of claim 2, further comprising the steps of:
   executing a first set of shader program instructions to perform the steps of determining the extrapolation weight and computing the extrapolated texel value when the shader program conditional value indicates that the ideal LOD corresponds to a nonresident mipmap level; and
   executing a second set of shader program instructions to compute an interpolated texel value when the shader program conditional value indicates that the ideal LOD corresponds to a resident mipmap level.

4. The method of claim 1, further comprising the step of notifying a device driver that a nonresident mipmap level corresponding to the ideal mipmap level and all mipmaps between lowest LOD resident mipmap and ideal mipmap should be loaded into memory to become resident mipmaps.

5. The method of claim 1, further comprising the step of determining that the ideal LOD corresponds to a nonresident mipmap level.

6. The method of claim 1, wherein the step of computing the extrapolated texel value comprises using an extrapolation minification texture filter when the ideal LOD is greater than a highest resolution LOD mipmap level of the texture map and is less than the extrapolation threshold LOD.

7. The method of claim 1, wherein the step of computing the extrapolated texel value comprises using an extrapolation magnification texture filter when the ideal LOD is less than a highest resolution LOD mipmap level of the texture map and the highest resolution LOD mipmap level is a nonresident mipmap level.

8. The method of claim 1, further comprising selecting a filter type of extrapolated mipmapped nearest-neighbor or extrapolated mipmapped linear that is specified for a texture filter.

9. The method of claim 1, further comprising the steps of:
   increasing the extrapolation weight by one to produce an increased extrapolation weight;
   scaling the first texel values by the increased extrapolation weight;
   negating the extrapolation weight to produce a negated extrapolation weight; and
   scaling the second texel values by the negated extrapolation weight.

10. The method of claim 1, further comprising the step of determining the extrapolation weight using the deltaLOD to read an entry from a table that stores a set of extrapolation weight values representing an extrapolation filter.

11. A non-transitory computer-readable storage medium containing instructions for controlling a computer system to extrapolate between resident mipmap levels of a texture map to produce texel values for a nonresident mipmap level of the texture map, comprising:
   computing an ideal level of detail (LOD) corresponding to an ideal mipmap level;
   computing a deltaLOD as a difference between the ideal LOD and an extrapolation threshold LOD that is a value greater than or equal to an LOD of a highest resolution resident mipmap level of the texture map;
   determining an extrapolation weight based on the delta-LOD;
   computing an extrapolated texel value that approximates a texel value of the ideal mipmap using the extrapolation weight, texel values from a mipmap whose mipmap level equals an integer portion of the extrapolation threshold LOD, and texel values from a next-highest resolution resident mipmap level; and
   producing an image suitable for display using the extrapolated texel value.

12. A system for extrapolating between resident mipmap levels of a texture map to produce texel values for a nonresident mipmap level of the texture map, comprising:
   a memory configured to store the resident mipmap levels; and
   a texture unit coupled to the memory and configured to:
      compute an ideal level of detail (LOD) corresponding to an ideal mipmap level;
      compute a deltaLOD as a difference between the ideal LOD and an extrapolation threshold LOD that is a value greater than or equal to an LOD of a highest resolution resident mipmap level of the texture map;
      determine an extrapolation weight based on the delta-LOD; and
      compute an extrapolated texel value that approximates a texel value of the ideal mipmap level using the extrapolation weight, first texel values from a mipmap whose LOD equals an integer portion of the extrapolation threshold LOD, and second texel values from a next-highest resolution resident mipmap level.

13. The system of claim 12, wherein the texture unit is further configured to select a filter type specified for an extrapolated minification texture filter when the ideal LOD is greater than a highest resolution LOD mipmap level of the texture map and is less than the extrapolation threshold LOD.

14. The system of claim 13, wherein the filter type is extrapolated mipmapped nearest-neighbor or extrapolated mipmapped linear.

15. The system of claim 12, wherein the texture unit is further configured to select a filter type specified for an extrapolated magnification texture filter when the ideal LOD is less than a highest resolution LOD mipmap level of the texture map and the highest resolution mipmap level of the texture map is a nonresident mipmap level.

16. The system of claim 15, wherein the filter type is extrapolated mipmapped nearest-neighbor or extrapolated mipmapped linear.

17. The system of claim 12, wherein the texture unit is further configured to notify a device driver that the ideal mipmap level should be copied into memory to become a resident mipmap level.

18. The system of claim 12, wherein the texture unit is further configured to set a shader program conditional value based on the ideal LOD.

19. The system of claim 12, wherein the texture unit includes an extrapolation weight table that stores a set of extrapolation weight values representing an extrapolation filter.

20. The system of claim 15, further comprising a memory storage having a greater access latency compared with the memory and configured to store the nonresident mipmap levels.

* * * * *